United States Patent [19]
Whelan

[11] 3,750,286
[45] Aug. 7, 1973

[54] APPARATUS FOR SUPPLYING SALT TO CURD IN CHEESE MANUFACTURE

[75] Inventor: Edmund Kerran Whelan, Hawera, New Zealand

[73] Assignee: The National Dairy Association of New Zealand Limited, Wellington, New Zealand

[22] Filed: Jan. 6, 1972

[21] Appl. No.: 215,780

[52] U.S. Cl. ................................... 31/46
[51] Int. Cl. ............................. A01j 25/00
[58] Field of Search .................................. 31/46, 89

[56] References Cited
UNITED STATES PATENTS

| 3,543,403 | 12/1970 | Speglic et al. | 31/89 |
| 2,942,343 | 6/1960 | Sjoholm et al. | 31/46 |
| 3,636,630 | 1/1972 | Budahn | 31/89 |

Primary Examiner—Hugh R. Chamblee
Attorney—Eric H. Waters et al.

[57] ABSTRACT

The apparatus comprises an endless conveyor having an upper run on one end of which milled and unsalted curd can be placed so that the curd will be carried as a layer to the other end of the run for discharge. A salting mechanism, including an elevated salt distributing hopper, is adapted to feed salt to a salt distributing boom lying over the upper run of the conveyor, the salt being conveyed by salt feed tubes extending from the salt distributing hopper to the boom. A sensing device is positioned to move upwardly and downwardly with rise and fall in the level of the layer of curd on the upper run of the moving conveyor and the rate of flow of salt from the storage hopper through the feed tubes to the distributing boom is controlled in response to the upward and downward movements of the sensing device.

8 Claims, 12 Drawing Figures

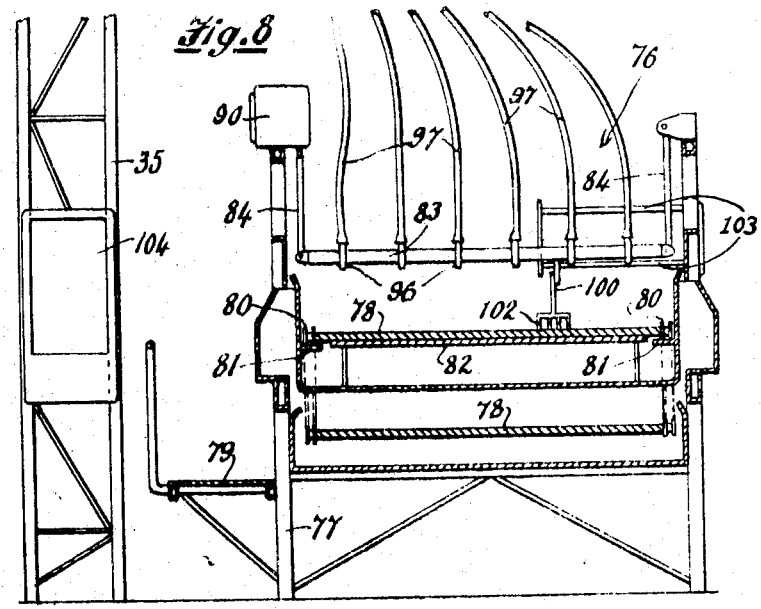
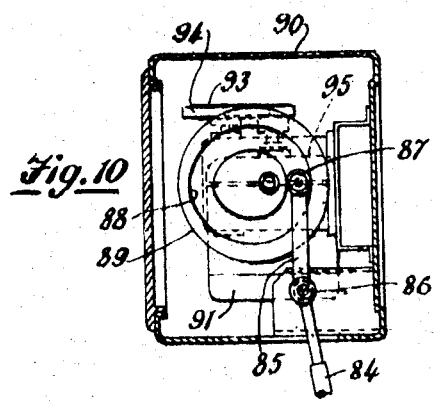

APPARATUS FOR SUPPLYING SALT TO CURD IN CHEESE MANUFACTURE

The invention relates to apparatus for supplying salt to curd in cheese manufacture.

Hitherto, in the salting of cheese curd, the practice has been to throw salt into the vat containing the curd, the quantity of salt added being governed by the amount of milk used to make the curd and the degree of salinity to be imparted to the cheese formed from the curd.

The advent of mechanised flow-line methods pertaining to cheese manufacture calls for a way of salting curd automatically, and the present invention provides apparatus for doing this in an efficient and reliable manner.

The apparatus of the invention comprises an endless conveyor having an upper run on one end of which milled and unsalted curd can be placed so that the curd will be carried as a layer to the other end of the said run for discharge; salting mechanism including an elevated salt distributing hopper; a salt distributing boom lying over the upper run of the conveyor, and salt feed tubes extending from the salt distributing hopper to the boom; a sensing device which will move upwardly and downwardly with rises and falls in the level of the layer of curd on the upper run of the moving conveyor; and means responsive to the said upward and downward movements of the sensing device for controlling the rate of flow of salt from the storage hopper through the feed tubes to the distributing boom.

With the apparatus of the invention, the quantity of salt that has eventually to be contained in the curd per unit volume of the latter, is predetermined according to the degree of salinity required in the end product. Once this figure has been decided on, then the quantity of salt that is supplied at a particular moment to the layer of curd carried along by the conveyor, will depend on the particular thickness of the layer at the point where it actually influences the sensing device. Thus, when the sensing device moves upwardly as a result of a momentary increase in the level of the moving layer of curd, more salt from the hopper will be supplied to the curd at this time, while when the sensing device moves downwardly as a result of a momentary decrease in the level of the moving layer of curd, the quantity of salt supplied will be correspondingly decreased. This ensures that at the end of the run, the total quantity of curd will have received the correct amount of salt.

The manner in which the invention may be carried into practical effect will now be described with reference to the accompanying drawings, in which:

FIG. 8 (sheet 6) illustrates the conveyor part of the apparatus as viewed from one end of this part, the conveyor being shown in cross-section;

FIG. 10 (sheet 6) is an end view corresponding to FIG. 9;

FIG. 11 (sheet 2) is a side elevational view of the sensing device, and

FIG. 12 (sheet 2) is a front elevational view of the sensing device.

Figure 1:
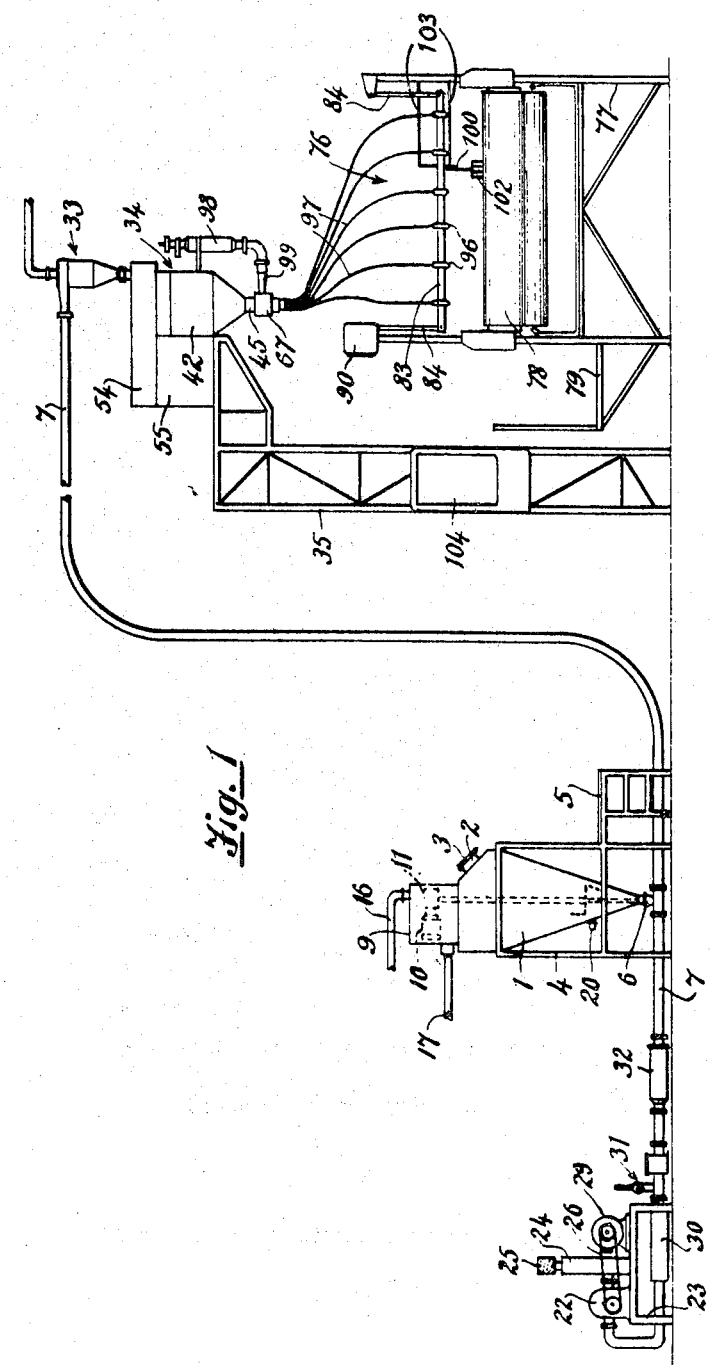
FIG. 1 is an elevational view showing the general layout of the apparatus of the invention.

As illustrated, the apparatus comprises a bulk salt storage hopper 1 (FIGS. 1 and 2) which will usually be situated adjacent to the salt room in the cheese factory and is so arranged that its lower end lies near to ground or floor level. The bulk storage hopper 1 has a capacity of, say, about 450 lbs. of salt and, near its top, is formed with an opening 2 through which it can be replenished with salt as the need arises, the opening being normally closed by a hinged cover 3. The bulk storage hopper is supported from the ground or floor by framework 4 which includes a working platform 5 enabling the replenishing operation to be performed without difficulty.

At its lower end, the bulk storage hopper 1 is fitted with a feed-out unit 6 including a feed screw which, on being rotated, acts to draw salt from the bulk hopper and supply it in a steady stream and in relatively small quantity to a transfer pipe 7. The feed-out unit 6 also includes an air seal valve which, while allowing salt to be fed to the transfer pipe 7 in the manner described above, at the same time prevents air that has been pressurized in the pipe 7 in a manner shortly to be described, from passing up into the bulk storage hopper 1.

The feed screw of the feed-out unit 6 is rotated by means of a vertical shaft 8 (FIG. 2) arranged axially within the bulk storage hopper 1, the lower end of the shaft being connected to the feed screw, while the upper end thereof passes into a compartment 9 mounted on the top of the bulk hopper. The compartment 9 contains an electric motor 10 adapted to drive the shaft 8 through a speed reduction gear box 11 and a belt drive arrangement 12 (FIG. 2), also accommodated in the compartment 9.

The upper part of the feed screw drive shaft 8 is surrounded by a hollow shaft 13 which is also adapted to be driven from the electric motor 10 and gear box 11, but in this instance, independantly through a separate belt drive arrangement 14 (FIG. 2), the hollow shaft 13 being provided with arms which are arranged in the lower half of the bulk storage hopper 1 and, on rotation of this shaft, act as an agitator or stirrer 15 ensuring that the salt within the hopper will not pack or bridge while the apparatus is in operation.

Means are provided for passing cooling air through the compartment 9 so as to keep cool the motor 10 and the other parts accommodated in the compartment. To this end, there is provided a cool air inlet pipe 16 (FIGS. 1 and 2) which opens into the top of the compartment, and a warm air exhaust pipe 17 which extends from the lower part of the compartment and contains an extractor fan 18 (FIG. 2) driven by a small electric motor 19.

In a plane positioned a little below the agitator 15, the bulk storage hopper 1 is provided with a device 20 which will act to give an indication when the amount of salt in the hopper falls below a certain level. The indicating device 20 may operate electrically. In that case and where the bulk storage hopper 1 is arranged near a salt room and this contains a salt-holding bin arranged at a higher level than the hopper 1, a supply pipe may extend between the bin and the upper part of the hopper, the supply pipe containing a flow-control valve operated electrically from the indicating device 0 in such a manner that when the device senses a fall of the salt below a certain level in the hopper 1, it will operate to open the flow-control valve and thus allow more salt to pass from the bin to the hopper, while when the indicating device senses that the level of salt supplied to the hopper has risen to the requisite extent, it will operate to close the flow-control valve, thus cutting off further supply of salt to the hopper 1 until the level again falls to minimum.

Figure 2:
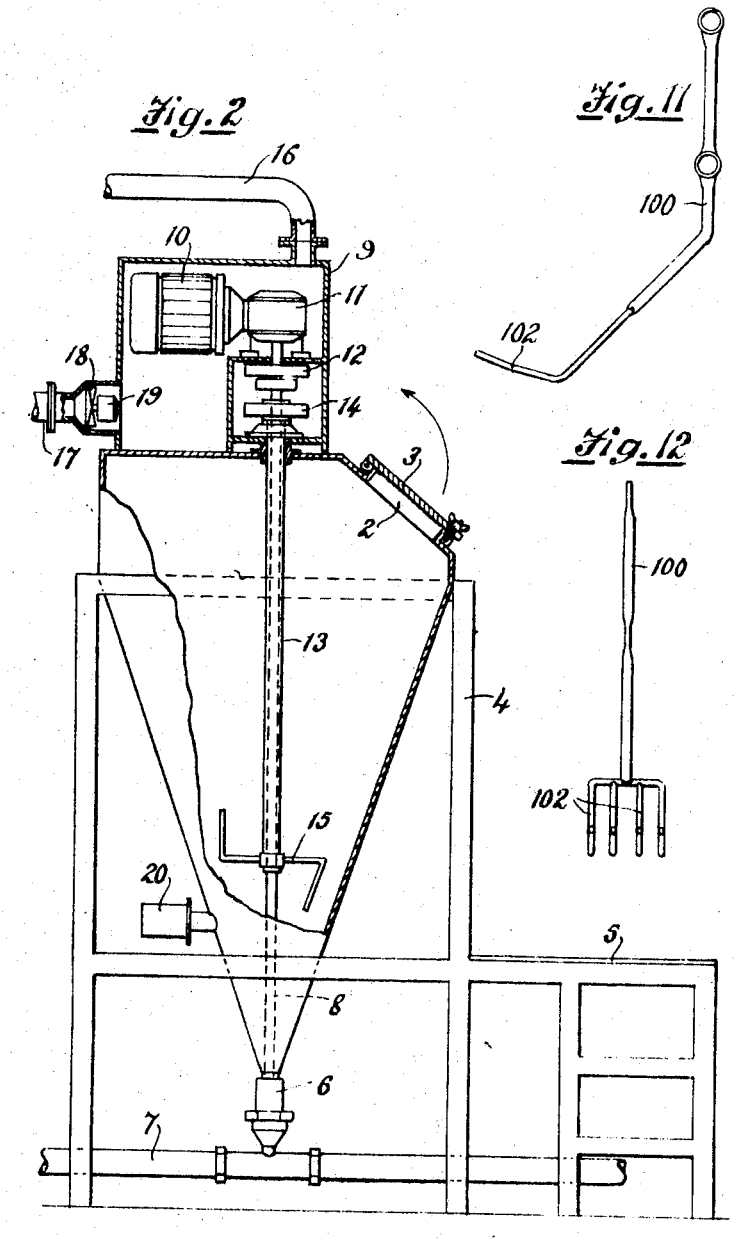
FIG. 2 is a vertical sectional view of a bulk salt storage hopper forming part of the apparatus.
Figure 3:
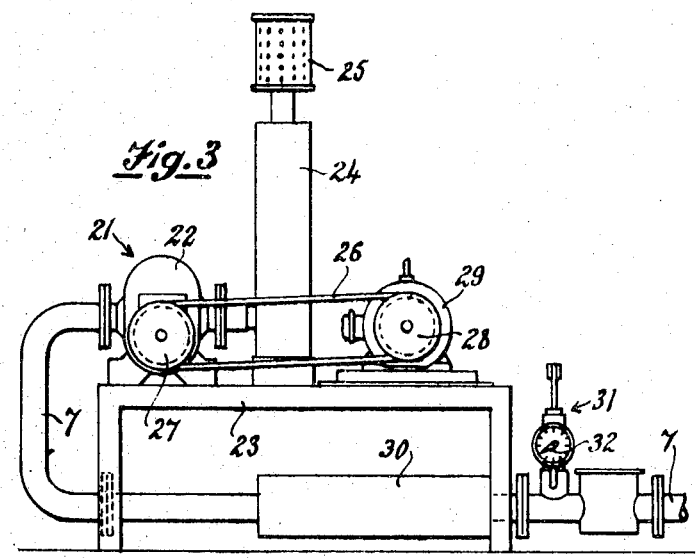
FIG. 3 is a side elevational view of a power driven positive displacement blower also forming part of the apparatus.

The transfer pipe 7 extends from an air pressure supply unit generally indicated at 21 in FIGS. 1 and 3. This unit comprises a positive displacement air blower 22 which is mounted on a stand 23 and to the output side of which one end of the transfer pipe 7 is connected. The input side of the blower 22 is connected to a vertically disposed air-intake pipe 24 which is fitted at the top with an air strainer 25. The blower 22 is adapted to be driven by a belt 26 which passes around a pulley 27 (FIG. 3) on the shaft of the blower and also around a pulley 28 on the shaft of an electric motor 29 also mounted on the stand 23.

At a relatively short distance from the blower 22, the transfer pipe 7 is provided with an expansion chamber 30 which acts to smooth out the flow of air through the part of the pipe that extends from the expansion chamber towards and beyond the feed-out unit 6 of the bulk storage hopper 1.

Between the expansion chamber 30 and the feed-out unit 6, the transfer pipe 7 is fitted with an air-pressure control unit 31. This unit contains an adjustable pressure-relief valve which, when the pressure of the air within the transfer pipe exceeds a predetermined amount, opens to allow a proportion of the air in the transfer pipe 7 to be vented to atmosphere, such venting continuing until the pressure in the pipe is reduced to the requisite extent, whereupon the relief valve moves back to its closed position. There is associated with the relief valve a pointer 32 (FIG. 3) movable over a graduated dial which indicates the pressure prevailing within the pipe 7. The relief valve is adjustable in the manner of a safety valve so that it will respond to the pressure at which it is desired to maintain the air within the transfer pipe.

At a point lying between the air-pressure control unit 31 and the feed-out unit 6 of the bulk storage hopper 1, there is provided a device 32 (FIG. 1) for heating the air passing along the transfer pipe 7. This device may operate with piped hot water or steam, or with electricity, whichever is most convenient.

Figure 4:
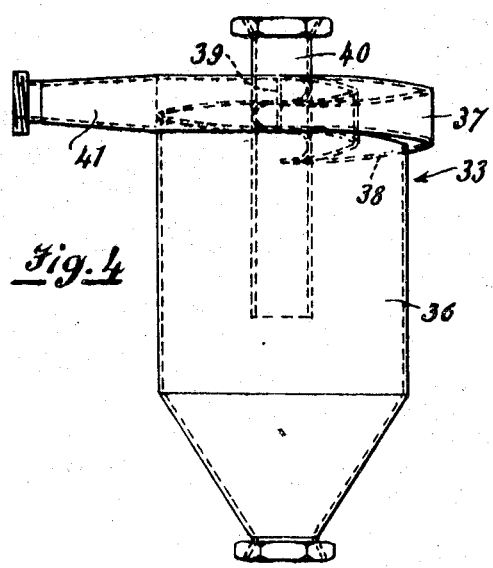
FIG. 4 is a side elevational view of a cyclone device forming another part of the apparatus.
Figure 5:
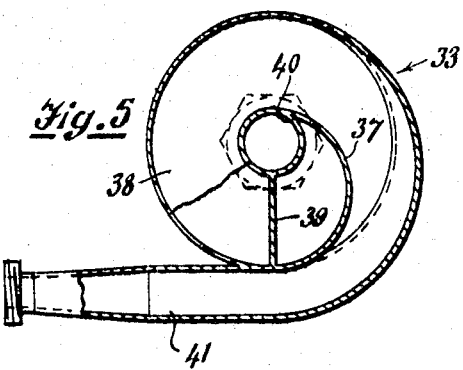
FIG. 5 is a part-sectional plan view of the cyclone device.
Figure 7:
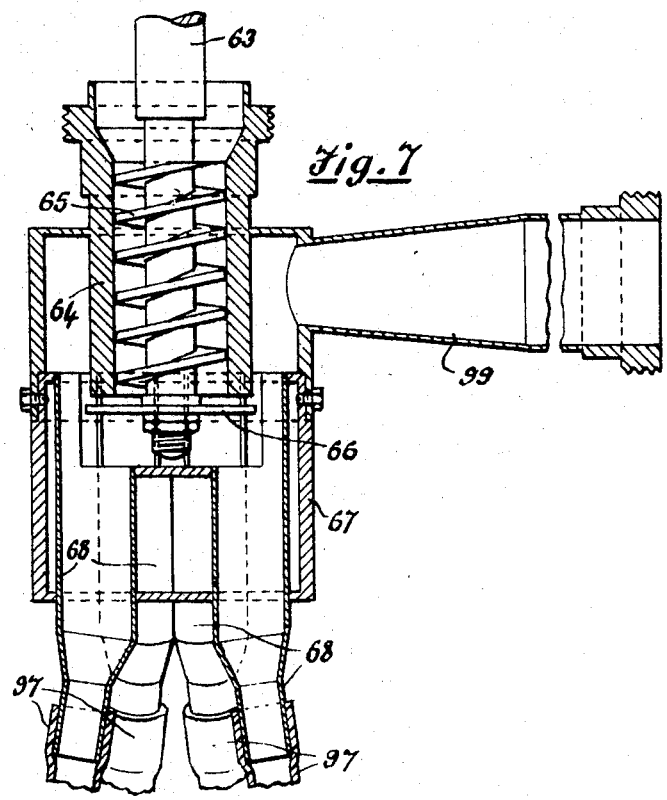
FIG. 7 (sheet 4) is a vertical sectional view of the lower end part of the salt feed hopper.
Figure 6:
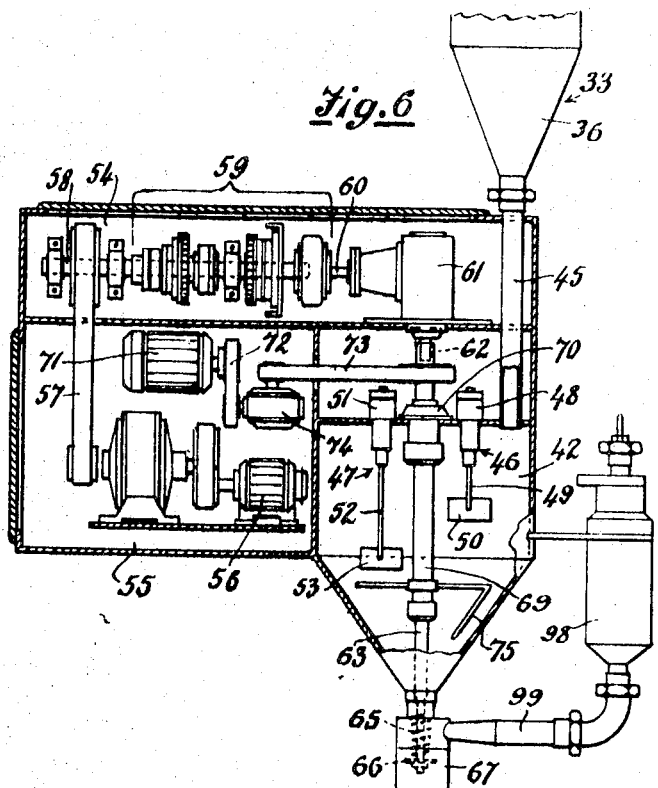
FIG. 6 is a part-sectional side elevational view illustrating the salt feed hopper from which salt is supplied to the salt distributing boom, the Figure also illustrating mechanism directly associated with this hopper.

From the feed-out unit 6 of the bulk storage hopper 1, the transfer pipe 7 extends to salt separating and distributing mechanism comprising a cyclone device generally indicated at 33 in FIGS. 1 and 4 to 6, and a salt distributing hopper generally indicated at 34 in FIGS. 1, 6 and 7, the cyclone device 33 being mounted on the salt distributing hopper 34 which, in turn, is supported from the top of a tower 35 so that it is at a higher level than the bulk salt-storage hopper 1. The end of the transfer pipe 7 that is remote from the air pressure supply unit 21 is connected to the cyclone device 33.

When the apparatus is in operation, salt coming from the feed-out device 6 of the bulk storage hopper 1 passes into the transfer pipe 7 and becomes mingled with the stream of air passing along this pipe to the cyclone device 33, the salt supplied to the pipe thus being entrained in the air stream and being carried thereby to the cyclone device. As shown in FIGS. 4 and 5 and partly in FIG. 6, the cyclone device consists of a casing 36, the upper end portion of which is of cylindrical form while the lower end portion is of funnel-shape. The upper end part of the casing 36 is provided with plates 37 and 38 which are so formed and connected together that this part of the casing is formed with a passageway of volute or snail-shell shape. A baffle 39 is provided at the inner end of the volute passageway, this end opening into the casing 36 and surrounding a vertically disposed air exhaust tube 40, the upper end of which opens above the upper end of the casing, while the lower end of the tube 40 opens into the casing 36 at a point lying about midway between the upper and lower ends of the latter and thus below the volute passageway. The outer end of the volute passageway is formed with a tangentially disposed tubular branch 41 to which the corresponding end of the transfer pipe 7 is connected.

When the stream of air, with entrained salt, passing through the transfer pipe 7, reaches the cyclone device 33, it travels along the volute passageway in the top part of this device, the passageway then acting to convert the stream into a vortex. When the mixture of air and salt reaches the inner end of the passageway, it passes into the upper part of the casing 36, the centrifugal force which has been set up in the mixture by the vortex thereupon causing the salt particles to be thrown outwardly against the inner face of the cylindrical part of the casing so that they then become separated from the stream of air and fall down into the funnel-shaped lower part of the casing 36. The air from which the salt has thus been separated, flows into the lower end of the exhaust tube 40 and then passes up the tube to the outside of the casing. As the exhausted air may still contain some residual particles of salt, it is preferably piped from the upper end of the tube 40 to a desalination device (not shown), the air thus freed of residual particles of salt then escaping to atmosphere. The desalination device, where employed, may be in the form of an air washer operating with water which acts to absorb the salt in the air, the salinated water then being conducted to waste. When a desalination device of this kind is used, it may be so co-ordinated with the air pressure supply unit 21 that it operates only when this unit is running.

The salt distributing hopper 34 comprises a casing 42 (FIGS. 1 and 6) having a cylindrical upper part and a funnel-shaped lower part. A partition 43 (FIG. 6) extends across the cylindrical part of the casing 42 so that a compartment 44 is formed in the top end of the casing. A vertically disposed tube 45 is connected by its upper end to the lower end of the casing 36 of the cyclone device 33, the tube passing downwardly through the compartment 44 and partition 43 of the casing 42 of the salt distributing hopper 34, and opening into the part of the casing that lies below the partition 43. With this arrangement, the salt that has been separated from the air in the cyclone device 33 flows from the casing 36 of this device downwardly through the tube 45 into the part of the casing 42 of the salt distributing hopper 34 that lies below the partition 43.

The part of the casing 42 of the distributing hopper 34 in which the salt from the cyclone device 33 is received, contains upper and lower salt level control devices which are generally indicated at 46 and 47, respectively, in FIG. 6. The first of these devices, namely, the one marked 46, comprises an electric motor 48 of small power and low voltage arranged within the compartment 44 and the shaft of which is connected to a depending vertical rod 49 which projects into the part of the casing 42 lying directly beneath the partition 43. Paddle blades 50 are provided on the lower end of the rod 49. The other salt level control device 47 is constructed and mounted in much the same way as the one already described and comprises an electric motor 51 of small power and low voltage, a rod 52 depending vertically from the shaft of the motor, and paddle blades 53 provided on the lower end of the rod 52. The only difference between the devices 46 and 47 is that the rod 49 of the device 46 is made relatively short so that the paddle blades 50 thereon lie within that portion of the cylindrical upper part of the casing 42 that is situated directly below the partition 43, while the rod 52 of the device 47 is made relatively long so that the paddle blades 53 thereon lie at the junction between the cylindrical upper part of the casing 42 and the funnel-shaped lower part of the casing, the paddle blades 53 thus being in a plane which is lower than the plane in which the paddle blades 50 are situated.

The two motors 48 and 51 of the high and low salt control devices 46 and 47 are arranged in circuits which include that to the electric motor 10 associated with the bulk salt storage hopper 1, the arrangement working as follows when the whole apparatus is in operation:

When the level of the salt supplied to the casing 42 of the salt distributing hopper 34 from the cyclone device 33, lies below the level of the paddle blades 53 of the control device 47, it must also, of necessity, be below the level of the paddle blades 50 of the control device 46. The motors 48 and 51 will then be free to run, the circuit connections to the motor 10 being such that this motor will then also run, and the result then being that the motor 10 will operate not only to cause rotation of the agitator 15 within the bulk storage hopper 1, but will also cause the feed-out unit 6 to supply salt from the hopper 1 to the transfer pipe 7, whereby the salt will eventually reach the distributing hopper 34 by way of the cyclone device 33. When the level of the salt supplied to the distributing hopper 34 rises to the point where it starts to immerse the paddle blades 53 of the control device 47, the physical resistance imposed by the salt on these blades will stop rotation of the motor 51. As, however, the control device 46 is, at this stage, still free to run, the motor 10 will continue to run and thus salt will continue to be supplied to the distributing hopper 34 from the cyclone device 33. When the level of the salt within the distributing hopper 34 rises to the point where it begins to immerse the paddle blades 50 of the control device 46, the physical resistance imposed by the salt on these blades will stop rotation of the motor 48. When this takes place, both control devices 46 and 47 will be out of action, the result being that the motor 10 will then cease to run so that the flow of salt from the bulk hopper 1 into the transfer pipe 7 will cease, with consequent cessation of supply of salt to the distributing hopper 34. When the level of the salt in the distributing hopper 34 falls sufficiently to free the paddle blades 50 and 53 of both control devices 46 and 47 so that both of these devices are then free to operate together again, the motor 10 will also come into operation again to thereby cause salt from the bulk hopper 1 to be supplied to the distributing hopper.

The capacity of the distributing hopper 34 can conveniently be such that the hopper will hold about 70 lbs. of salt between high and low levels.

The distributing hopper 34 is secured to and depends from a casing 54 which is mounted on another casing 55 (FIGS. 1 and 6). The distributing hopper 34 is also attached by one side to this second casing 55 which is mounted on and secured to the upper end of the tower 35.

The casing 55 contains an electric motor 56 (FIG. 6) which is adapted to drive, by means of transmission mechanism including a belt 57, a horizontally extending countershaft 58 arranged within the casing 54. The countershaft 58 incorporates electrically controlled variable speed transmission mechanism generally indicated at 59, the output end of this mechanism being connected to the input shaft 60 of a speed reduction gear box 61, while the output shaft 62 of the gearbox is connected to a vertical shaft 63 passing down axially through the distributing hopper 34. The lower end of the hopper 34 is connected to the upper end of a vertically disposed sleeve 64 (FIG. 6) through which the lower end part of the shaft 63 extends, this part of the shaft being fitted with a feed-worm 65 which is engaged closely but rotatably in the sleeve 64. To the lower end of the shaft 63 there is secured a spreader disc 66 which is spaced at a short distance below the lower end of the sleeve 64. The sleeve is surrounded by a box 67 (see also FIG. 1) fitted with a plurality of downwardly extending tubular spouts 68. The upper ends of the spouts open within the box 67 in the locality of the spreader discs 66, while lower end portions of the spouts project below the bottom of the box.

With the arrangement just described, when the shaft 63 is rotated from the motor 56, the feed worm 65 will act to draw salt from the distributing hopper 34 and carry it on to the spreader disc 66, rotation of the disc then causing the salt to be thrown by centrifugal force radially and evenly from the periphery of the disc from which the salt will then fall in even amounts, into the spouts 68.

The upper part of the shaft 63 is surrounded by an independently rotatable tubular shaft 69 which is supported for rotation by a bearing 70 arranged within the compartment 44 and mounted on the partition 43. The compartment 55 contains a second electric motor 71 which is adapted to drive the tubular shaft 69 through the medium of transmission mechanism including belts 72 and 73 and a speed reduction gear box 74, part of this mechanism being accommodated in the compartment 55 and the remaining part in the compartment 44. The lower end of the tubular shaft 69 terminates in the funnel-shaped lower part of the casing 42 of the distributing hopper 34, this end of the shaft being fitted with arms which, when the shaft 69 is in rotation, act as an agitator or stirrer 75 for the salt lying in this part of the casing 42. The circuit connections to the motors 56 and 71 are preferably such that when the motor 56 is not running, the motor 71 is also idle.

Beneath the distributing hopper 34 there is provided a conveyor assembly generally indicated at 76 in FIGS. 1 and 8. This assembly comprises a framework 77 supporting a conveyor 78 an provided at one side with a walkway 79, The conveyor is of the endless belt type having an upper run and a lower run, the conveyor including side chains 80 (FIG. 8) which are adapted to move along tracks 81 extending horizontally along the sides of the framework 77. The ends of the conveyor 78 pass over rollers one of which is fitted with sprockets engaged by the chains 80 and driven from a suitable source of power such as an electric motor acting through transmission mechanism including a speed reduction gear box. The upper run of the conveyor 78 moves over a plate 82 (FIG. 8) which forms part of the framework 77 and acts to keep this run flat. One end of the upper run of the conveyor constitutes the loading end while the other end of this run constitutes the discharge end. When the apparatus is in operation, milled and unsalted curd is placed on the loading end of the uppper run of the conveyor, this run then acting to carry the curd to the discharge end from which it is collected.

Figure 9:
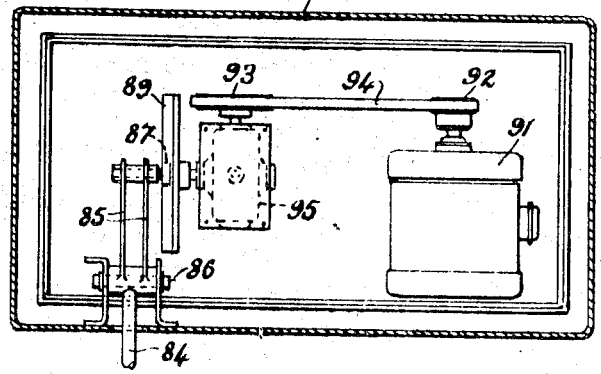
FIG. 9 (sheet 5) is a side elevational view of means employed for oscillating the salt distributing boom.

At a suitable distance above the upper run of the conveyor 78 and intermediate the ends thereof there is provided a transversely extending boom 83 (FIGS. 1 and 8) the ends of which are pivotally connected to drop-links 84 which are pivotally suspended from the framework 77 in such manner that the boom is able to have applied to it a limited amount of oscillatory movement such movement being transversely of the conveyor 77 and thus in the direction of the length of the boom itself. For oscillating the boom 83, and as illustrated in FIGS. 9 and 10, one of the drop-links 84 has an arm extending above the point 86 at which this link is pivoted to the framework 77, the upper end of the arm 85 being provided with a roller 87 engaged in a cam groove 88 in a rotatable disc 89. The arm 85 and cam disc 89 are accommodated in a box 90 attached to a side of the framework 77 and the cam disc is driven from an electric motor 90 (FIG. 9) also arranged within the box 90 and connected to the disc 89 by transmission mechanism, including pulleys 92 and 93, a driving belt 94 and a speed reduction gear box 95, likewise arranged within the box 90. For simplicity of illustration, the motor 91 is not shown in FIG. 10.

The boom 83 carries a plurality of downwardly projecting outlet nozzles 96 (FIGS. 1 and 8) which are spaced equally from each other along the boom and match in number the spouts 68 projecting from the box 67 that surrounds the sleeve 64 at the lower end of the distributing hopper 34. Feed tubes 97 of rubber or other suitable flexible material extend downwardly from the lower ends of the spouts 68 to the upper ends of the nozzles 96 on the boom 83, the arrangement thus being such that when the apparatus is in operation and milled curd is being transported by the upper run of the conveyor 78, the salt supplied to the spouts 68 from the distributing hopper 34 by way of the worm 65 and spreader disc 66, will run down the feed tubes 97 and be deposited by the nozzles 98 onto the moving curd. During such deposition, the boom 83 is being oscillated in the manner described, the nozzle 98 thus acting to distribute the salt over the full width of the layer of curd while this is being moved along the conveyor assembly 76 by the upper run of the conveyor 78.

In association with the box 67 containing the sleeve 64 at the lower end of the distributing hopper 34 there is provided a device 98 (FIGS. 1 and 6) which acts to heat air and conduct it through an injection tube 99 (see also FIG. 7) into the upper part of the box 67, that is to say, the part surrounding the part of the sleeve 64 that lies within the box. The air heating device 98 may operate with piped hot water or steam, or may contain an electric heating element. Air for the device 98 may be tapped from the transfer pipe 7 or may be obtained from a separate source. In the latter event the device will be fitted with an induction fan driven by a small electric motor.

Heated air coming from the device 98 into the box 67 by way of the injection tube 99 will act to keep dry the salt coming from the spreader disc 66 into the spouts 68. It will also flow into the spouts and then pass down the tubes 97 and out of the nozzles 96, thus helping to keep the salt supplied to the spouts and tubes in a free-flowing condition and assisting in the spreading of the salt from the nozzles on to the curd.

The conveyor assembly 76 further comprises a sensing device which will move upwardly and downwardly with rises and falls in the level of the layer of curd supported by and moving with the upper run of the conveyor 78, there also being provided means responsible to such upward and downward movements of the sensing device for controlling the rate of flow of salt from the distributing hopper 34, through the feed tubes 97, to the nozzles 96 on the boom 83.

The sensing device consists of a fork having an upwardly extending stem 100 (FIGS. 1, 8, 11 and 12) pivotally supported between its ends, on a bracket 101 (FIG. 8) secured to a side part of the framework 77 of the conveyor assembly 76, the lower end portion of the stem 100 extending forwardly that is to say, in the direction of the discharge end of the conveyor 78 and having at its extremity a plurality of prongs 102 which also extend in a generally forward direction. The prongs are positioned in the locality of the boom 83 and also lie near to the longitudinal centre-line of the upper run of the conveyor 78. The prongs 102 also rest on the upper surface of the layer of curd lying on the upper run of the conveyor, the arrangement being such that as the conveyor moves the curd towards the discharge end of the conveyor, the prongs 102 will rise and fall with changes in the level of the upper surface of the curd, such rising and falling movement of the prongs causing a rocking movement to be applied to the upper end portion of the stem 100. This rocking movement acts, through a linkage 103 (FIGS. 1 and 8) and a cam to move a pivoted switch arm over a series of contacts whereby electrical signals are transmitted by pilot wires to programming micro-switches an other instrumentalities which act on the electrically controlled variable speed mechansim 59 associated with the shaft 63 in the distributing hopper 34, in such a way that the speed of revolution of this shaft varies. More specifically when the prongs 102 of the fork rise due to a rise in the level of the curd passing under them and with which they have contact, the pivoted switch arm will be moved on to a contact which completes a circuit resulting in the variable speed mechanism 59 being regulated suchwise as to cause an appropriate increase in the speed of revolution of the shaft 63, the effect of this being that the worm 65 and spreader plate 66 will act to supply a greater quantity of salt to the spouts 68 so that a correspondingly greater quantity of salt will be supplied to the curd by way of the tubes 97 and nozzles 96. It will be appreciated in this connection that a rise in the level of the upper surface of the curd at a particular point, connotes an increase in the thickness of the curd at this point, the curd thereby demanding more salt at this point than at a point at which the upper surface of the curd is at a lower level. When the prongs of the fork fall due to a lowering of the level of the upper surface of the curd at the point of contact with the prongs, the pivoted switch arm will move onto a contact which completes a circuit resulting in regulation of the variable speed mechanism 59 suchwise that the shaft 63 is driven at a lower speed, the ultimate effect being that the curd will be supplied with less salt at the lower level.

It will be seen that by the arrangement just described the curd will be served with the correct amount of salt commensurate with increases or decreases in the thickness of the layer of curd as it is being transported by the upper run of the conveyor 78 from the supply end of the conveyor to the discharge end thereof.

The pivoted switch arm contacts and other instrumentalities associated with the fork 100,102 and with the variable speed mechanism 59, are not illustrated in the drawings as their construction and installation to give the effects explained, will be well understood by the experienced electrician.

Instead of providing the electrically controlled variable speed mechanism 59, the transmission connections giving the necessary speed reduction between the motor 56 and the shaft 63 may be of conventional form. In that case, the pivoted switch arm, contacts and other instrumentalities associated with the fork 100,102 will serve to operate a variable rheostat through which flow of current to the motor 56 is controlled for varying the speed of the motor.

It is believed that the manner in which the whole apparatus operates will be sufficiently well understood from what has already been described, further explanation in this respect thus being unnecessary.

The apparatus is equipped with a control panel 104 (FIG. 1) which is conveniently mounted at a suitable level on the tower 35, the panel housing some of the electrical equipment, such as relays and timers, and being provided with push-buttons and indicators for controlling the otherwise automatic operation of the apparatus, all functions being clearly labelled and electric indication lamps being included for response to any malfunctioning that may occur.

We claim:

1. Apparatus for supplying salt to curd in cheese manufacture, comprising an endless conveyor having an upper run on one end of which milled and unsalted curd can be placed so that the curd will be carried as a layer to the other end of the said run for discharge; a salting mechanism including a salt storage hopper having a power driven feed-out device adapted to deposit salt in a steady stream from the said hopper, a transfer pipe for receiving salt from said hopper, said transfer pipe having opposite ends, an air pressure supply unit connected to one of the ends of the pipe, a salt separating device connected to the other end of said pipe, an elevated salt distributing hopper communicating with said separating device for receiving salt therefrom, said air pressure supply unit producing movement of air through the transfer pipe to cause the salt supplied to the pipe from said storage hopper to become entrained in the moving air in the pipe so that the mixture of air and salt passes to the salt separating device, the latter acting to separate at least the major part of the salt from the entraining air and to direct such salt into said distributing hopper, a salt distributing boom lying over the upper run of the conveyor, and salt feed tubes extending from said salt distributing hopper to said boom; a sensing device positioned to move upwardly and downwardly with rise and fall in the level of the layer of curd on the upper run of the moving conveyor; and means responsive to the upward and downward movements of the sensing device for controlling the rate of flow of salt from the distributing hopper through the feed tubes to the distributing boom.

2. Apparatus in accordance with claim 1 wherein the transfer pipe includes means for heating the air passing therethrough.

3. Apparatus in accordance with claim 1 wherein the transfer pipe includes a relief valve to keep the air passing through the pipe at a constant predetermined pressure.

4. Apparatus in accordance with claim 1 comprising power driven feed-out means for drawing salt from the distributing hopper, a plurality of downwardly extending spouts for receiving the salt from the distributing hopper, said distributing boom having outlet nozzles, said spouts being connected by the salt feed tubes to the outlet nozzles on the distributing boom.

5. Apparatus in accordance with claim 4 wherein said feed-out means comprises a shaft arranged within the distributing hopper and fitted with a salt-discharge worm, said shaft being adapted to be driven by an electric motor through an electrically controlled variable speed transmission mechanism.

6. Apparatus in accordance with claim 4 comprising means for supplying heated air to said spouts for flow therethrough and through the feed tubes to the outlet nozzles, such air acting to keep the flowing salt in a dry and free-flowing condition.

7. Apparatus in accordance with claim 4 wherein said boom extends transversely over the upper run of the conveyor, and comprising means for oscillating the boom in the direction of its length.

8. Apparatus in accordance with claim 6 wherein said sensing device comprises a fork having a pivotally mounted stem and prongs which are adapted to bear on the upper surface of the layer of curd on the upper run of the conveyor, a pivoted switch arm adjacent a series of contacts, upward and downward movement of the prongs causing the stem of the fork to move the switch arm over the contacts whereby electrical signals can be transmitted to programming means to act on an electrically controlled variable speed transmission mechanism associated with the worm shaft in the distributing hopper to cause a change in the speed of rotation of the said shaft.

* * * * *